United States Patent Office 3,244,976
Patented Apr. 5, 1966

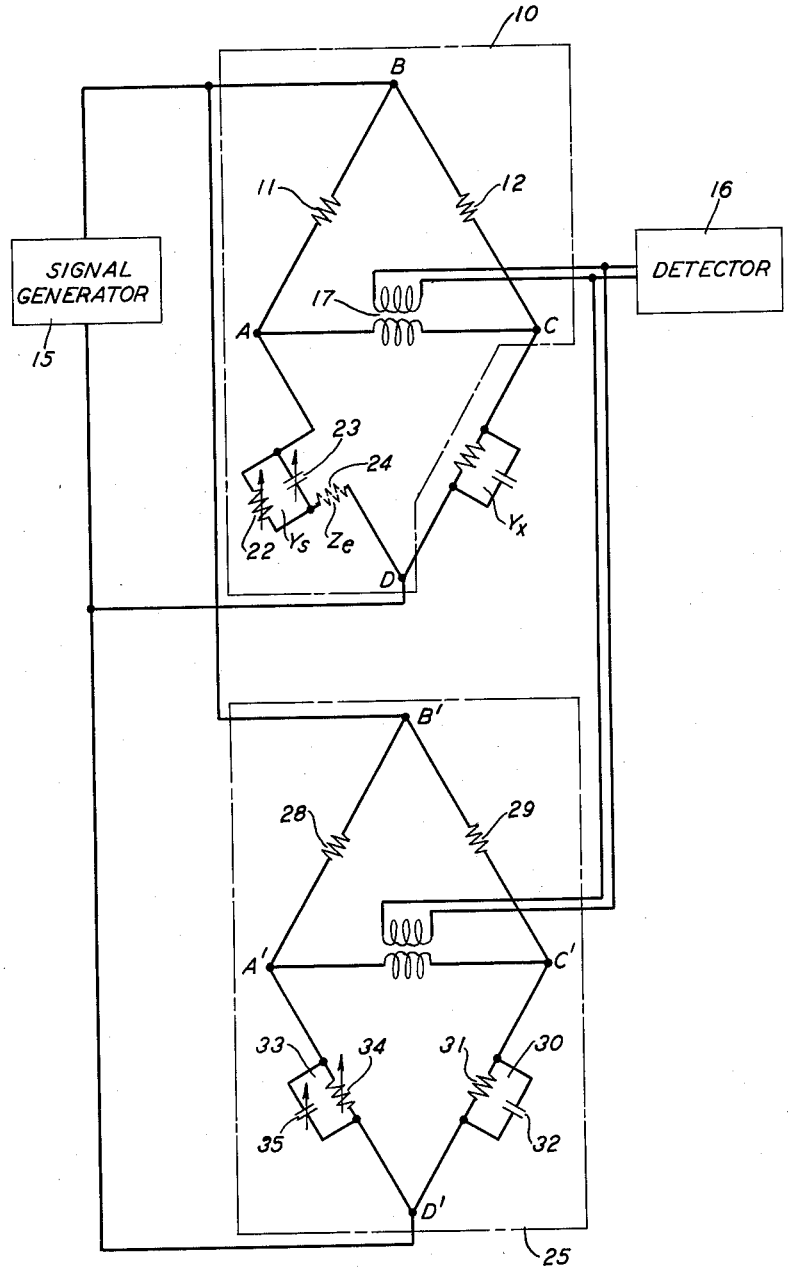

3,244,976
APPARATUS FOR MEASURING ADMITTANCE OF ELECTRICAL NETWORKS USING A DOUBLE WHEATSTONE BRIDGE CONNECTED IN PARALLEL
Stephen Doba, Jr., Berkeley Heights, N.J., assignor to Bell Telephone Laboratories, Incorporated, New York, N.Y., a corporation of New York
Filed Dec. 29, 1961, Ser. No. 163,343
1 Claim. (Cl. 324—57)

This invention relates to apparatus for measuring the admittance of an electrical network, and more specifically to such apparatus including a Wheatstone bridge circuit and an adjustable standard admittance in one arm for evaluating an unknown admittance in another arm in relation to the standard admittance.

Heretofore, a Wheatstone bridge circuit including ratio arms, a source of a signal having a suitable frequency and a detector responsive to the signal, together with the unknown and standard admittances, was known for comparing the value of an unknown admittance to the value of the standard admittance as determined by null readings produced in the detector by the signal, in response to appropriate adjustments of and corresponding readings produced on the standard admittance. A difference between two readings on the standard admittance provided a measure of the unknown admittance. One such circuit comprises the adjustable standard admittance including an adjustable resistor and an adjustable capacitor connected in parallel in one arm of the bridge, the unknown admittance comprising a fixed resistor and capacitor connected in parallel in another arm of the bridge, and the signal source and detector connected to the opposite bridge diagonals. It was found that due to an undesired coupling or impedance, a real or virtual impedance tended to occur effectively in series with the adjustable standard admittance whereby an error tended to be introduced into the readings of the standard admittance at the appropriate adjustments thereof. As a consequence, this virtual impedance tended to impair the accuracy of the measurement of the unknown admittance.

The present invention contemplates apparatus in association with a Wheatstone bridge circuit to eliminate substantially the effect of such virtual impedance for evaluating an unknown admittance in relation to a standard admittance.

It is therefore a principal object of the invention to improve the accuracy of the evaluation of unknown admittances at high frequencies.

It is another object to eliminate the effect of a virtual impedance in comparing the value of an unknown admittance with the value of a standard admittance.

It is a further object to eliminate the error due to a virtual impedance effectively arising in series with a standard admittance used to measure an unknown admittance.

It is a still further object to reduce the value of the virtual impedance to zero.

In association with a known type of Wheatstone bridge circuit adapted for measuring the value of an unknown admittance in relation to the value of a standard admittance and including two resistance ratio arms, an unknown admittance in a third arm, an adjustable standard admittance in a fourth arm, a source of suitable alternating current signal connected to one bridge diagonal and a signal detector to the opposite bridge diagonal, the present invention comprises a second or auxiliary Wheatstone bridge circuit having two resistance ratio arms, a fixed admittance in a third arm, a second adjustable admittance in a fourth arm and its one and other diagonals connected to the one and other diagonals, respectively, of the first-mentioned bridge circuit. The second adjustable admittance includes an adjustable resistor and an adjustable capacitor.

In the performance of the technique for measuring the value of the unknown admittance in relation to the value of the standard admittance, the initial step involves an adjustment of the auxiliary admittance to reduce to zero the virtual impedance tending to arise effectively in series with the first-mentioned standard admittance. This, in the performance of the subsequent steps of the measuring technique, tends to improve the accuracy of the measurement of the unknown admittance in relation to the known admittance.

The invention will be readily understood from the following description when taken together with the accompanying drawing which is a circuit diagram of a specific embodiment of the invention.

Referring to the drawing, a well-known type of Wheatstone bridge circuit adapted for measuring the value of an unknown admittance $Y_x$ in relation to the value of a standard admittance $Y_s$ includes a Wheatstone bridge 10 having ratio resistor arms 11 and 12, the adjustable standard admittance $Y_s$ in a third arm, an unknown admittance in a fourth arm, a source 15 of suitable alternating current signal connected to the vertical bridge diagonal, and a detector 16 coupled via transformer 17 to the horizontal bridge diagonal. The standard admittance may comprise, for example, an adjustable resistor 22 and an adjustable capacitor 23. The standard admittance may be provided with a suitable calibration which provides predetermined readings in relation to specific adjustments of both the resistor and capacitor in accordance with a well-known practice in the art. The known procedure for adjusting the standard admittance to evaluate the unknown admittance, as related to the value of a standard admittance, will now be described.

In the normal operation of the known bridge, the unknown admittance is initially disconnected from the bridge thereby placing that arm in an open-circuit condition, then the standard admittance connected in the bridge is adjusted to establish a null reading on the detector. This reading of the standard admittance is noted. Next, the unknown admittance is reconnected in the bridge, and the standard admittance is then adjusted until the null reading is re-established on the detector. Again, the reading of the standard admittance is noted. Now, the difference between the first and second readings of the standard admittance is the measure of the value of the unknown admittance as compared with the value of the standard admittance.

It is known for the admittance bridge discussed above that the bridge relationships may be summarized as follows:

K is the bridge factor,
$Y_x$ is the unknown admittance,
$Y_s$ is the admittance across the standard admittance
$Y_e$ is an admittance across the unknown admittance, and
$Z_e$ is the virtual impedance represented in FIG. 1 by virtual resistor 24 connected in series with the adjustable standard admittance $Y_s$.

The unknown admittance may then be represented by the equation $$Y_x + Y_e = \frac{KY_s}{1 + Y_s Z_e} \qquad (1)$$

As is known, the admittance $Y_e$ may be absorbed by an open circuit balance, and K may be determined by a measurement of a suitable known standard. However, the virtual impedance $Z_e$, represented by virtual resistor 24, will remain as an error unless it is determined by a measurement or computation, since in general it is impossible to insert an impedance in series with either the standard admittance $Y_s$ or unknown admittance $Y_x$ to compensate for such virtual resistor.

It may be seen from Equation 1 that impedance $Z_e$ tends to introduce an error into each of the aforementioned two readings of the standard admittance, as mentioned in an article by C. G. Mayo and J. W. Head, entitled "Errors in Bridge Measurements" and published on pages 265 through 267 of the Wireless Engineer, November 1956. This error may not be tolerable in instances wherein extreme accuracy in such measurements of the unknown admittance is required. As disclosed in the Mayo and Head article, the virtual impedance $Z_e$ is proportional to an admittance ($Y_{41}$ in their notation) which represents a direct transmission coupling between the signal generator and the detector. This admittance may be real or virtual, that is, it may exist due to some undesired effect which couples the signal voltage directly from the generator to the detector without flowing through the bridge terminals A and C in the drawing discussed above. The presence of virtual impedance $Z_e$, represented by virtual resistor 24 in the attached drawing, will be evidenced by a failure to obtain a null reading on the detector when the standard and unknown admittances $Y_s$ and $Y_x$, respectively, are short-circuited, as mentioned below.

In accordance with the present invention, a second or auxiliary Wheatstone bridge circuit 25, or its equivalent, comprises ratio resistance arms 28 and 29, a fixed admittance arm 30 comprising a fixed resistor 31 and a fixed capacitor 32 of suitably preselected values connected in parallel, an adjustable admittance arm 33 comprising an adjustable resistor 34 and an adjustable capacitor 35 connected in parallel, a vertical diagonal B'D' connected to the vertical diagonal BD of bridge 10, and a horizontal diagonal A'C' transformer coupled to detector 16 in parallel with the output of the horizontal diagonal AC of bridge 10.

The parameters of adjustable resistor 34 and adjustable capacitor 35 are so predetermined that the bridge 25 may be balanced or unbalanced by appropriate adjustments of such resistor and capacitor. Such adjustments will serve to eliminate or reduce to zero the effects of virtual impedance $Z_e$.

The value of unknown admittance $Y_x$ in relation to the standard admittance $Y_s$ may now be measured in accordance with the following procedure. Initially, the terminals AD and CD of bridge 10 are short-circuited thereby effectively disconnecting the standard and unknown admittances therefrom; and then auxiliary bridge 25 is adjusted via appropriate adjustments of adjustable resistor 34 and adjustable capacitor 35 therein to establish a first null reading on the detector. This will reduce the effect of the virtual impedance $Z_e$ to zero. Next, these short circuits are removed, with the standard admittance $Y_s$ connected between bridge terminals AD but the unknown admittance $Y_x$ still disconnected from bridge terminals CD thereby leaving the bridge arm CD open-circuited. Now, the standard admittance $Y_s$ is adjusted via adjustable resistor 22 and capacitor 23 to provide a second null reading on the detector, and a first reading on the standard admittance $Y_s$ is noted. Finally, the unknown admittance $Y_x$ is connected between bridge terminals CD, and the standard admittance $Y_s$ is again adjusted as above-mentioned to establish a third null reading on the detector whereupon a second reading on the standard admittance $Y_s$ is noted. The difference between these first and second readings of the standard admittance $Y_s$ is a measure of the value of the unknown admittance $Y_x$ compared with the value of the standard admittance $Y_s$. These readings will be free from the error due to the virtual impedance $Z_e$ whereby the accuracy of the measurement of the unknown admittance is improved.

It is understood that the afore-described arrangement is illustrative of the application of the principles of the invention. Other arrangements may be devised by those skilled in the art without departing from the spirit and scope of the invention. In particular, it will be apparent to those skilled in the art that the afore-described results may also be obtained in a Wheatstone bridge circuit adapted to measure the value of an unknown impedance in relation to the value of a known impedance, in a manner analagous to that hereinbefore described for measuring unknown admittances.

What is claimed is:

A system for measuring the value of an unknown admittance in relation to the value of a standard admittance comprising a first four-terminal Wheatstone bridge circuit having two ratio resistance arms connected to one of a first pair of diagonally opposite terminals of said bridge circuit, said unknown admittance in a third arm, and said standard admittance calibrated in a fourth arm, the junction point of said unknown admittance and said standard admittance being connected to the other of said first pair of terminals, a source of a signal of preselected frequency connected between said first pair of terminals, a detector connected between a second pair of diagonally opposite terminals of said first bridge circuit, means to adjust said standard admittance to produce a null reading on said detector, means to open-circuit said third arm of said first bridge circuit so that a measurement of the value of said unknown admittance is obtained from the difference between the value of said standard admittance during a null reading with said third arm of said first bridge circuit open circuited and the value of said standard admittance during a null reading with said unknown admittance connected in said third arm of said first bridge circuit, said standard admittance values including the effects of a virtual impedance which introduces error therein and means to substantially eliminate the effect of said virtual impedance comprising a second four-terminal Wheatstone bridge circuit having two adjoining ratio resistance arms, a first fixed admittance connected in a third arm, and a second admittance connected in a fourth arm, the terminal of said second bridge circuit between said ratio resistance arms being connected to one of said first pair of terminals of said first bridge circuit, the terminal of said second bridge circuit between said third and fourth arms being connected to the other of said first pair of terminals of said first bridge circuit, means connecting a remaining pair of terminals of said second bridge circuit to said detector, means to short out said standard admittance and said unknown admittance, and means to adjust said second admittance with both said standard admittance and said unknown admittance shorted out until a null indication is produced on said detector.

References Cited by the Examiner

UNITED STATES PATENTS

| 2,576,059 | 11/1951 | Wojciechowski | 324—57 |
| 2,771,579 | 11/1956 | Ruge | 324—57 X |
| 2,815,480 | 12/1957 | Ruge | 324—65 |
| 3,077,561 | 2/1963 | Revesz | 324—57 |

OTHER REFERENCES

Hague, B.: Alternating Current Bridge Methods, Pitman Publishing Corp., New York (1938), pp. 379–381.

Parramore: "A Double D.C. Bridge for precision measurements with load Cells," Journal of Scientific Instruments, vol. 35, May 1958, pp. 162–163.

WALTER L. CARLSON, *Primary Examiner.*

FREDERICK M. STRADER, *Examiner.*

A. E. RICHMOND, W. H. BUCKLER,

*Assistant Examiners.*